Patented Sept. 21, 1943

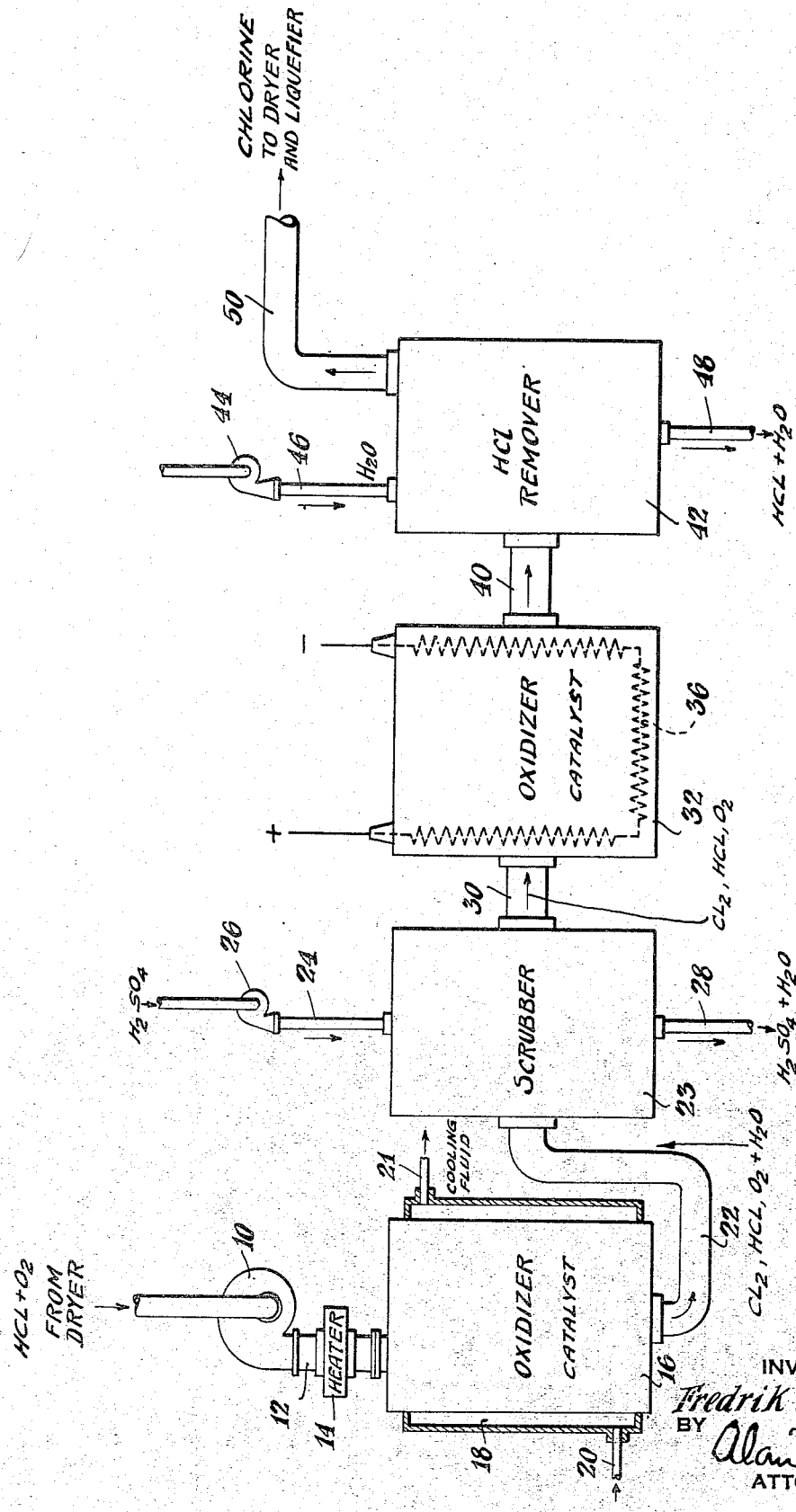

2,330,114

UNITED STATES PATENT OFFICE 2,330,114

METHOD OF MAKING CHLORINE

Fredrik W. de Jahn, New York, N. Y., assignor to Alan N. Mann, Scarsdale, N. Y.

Original application July 8, 1936, Serial No. 89,521. Divided and this application December 16, 1939, Serial No. 309,550

4 Claims. (Cl. 23—219)

This invention relates to a continuous method of producing chlorine by oxidizing hydrochloric acid gas.

According to my invention hydrochloric acid gas and oxygen after having been dried are heated and passed into a first oxidizing chamber in which is contained catalyst material. During the passage of the mixture through the first chamber, the hydrochloric acid gas and oxygen react to form chlorine and water. This chamber is maintained at about 385° to about 435° C. which in the presence of a new catalyst I find increases my yield over known processes. I have also found that if I use an excess of HCl such as a proportion of 4.05 to 4.09 HCl to 1 $O_2$, by volume a high concentration of $Cl_2$ is obtained in the effluent gas which is easy to liquefy without materially affecting the oxidation efficiency of the catalyst. This is a distinct improvement over the previous art which always used an excess of oxygen.

After the reaction in the first oxidizing chamber, the mixture of gases is passed into a sulphuric acid scrubber to remove the water formed during the reaction. In my process the gases after being passed through the scrubber can be passed directly to the second oxidizing chamber without other treatment to obtain my high yields. The dry mixture of gases is then passed from the sulphuric acid scrubber to a second oxidizing chamber which is preferably electrically heated. This second oxidizing chamber also contains catalyst material. The temperature of the mixture in this second oxidizing chamber is maintained at about 400° C. Atfer the reaction in the second oxidizing chamber, the mixture of gases is passed to a chamber to remove the hydrochloric acid gas. Water is introduced in this chamber to dissolve and remove the hydrochloric acid gas. The chlorine is conducted away from this chamber as a gas and is dried and then liquefied. The water solution containing hydrogen chloride is further treated to remove the hydrochloric acid gas by any known method. The recovered hydrochloric acid gas is then used as a part of the hydrochloric acid gas at the beginning of the operation or process.

Various types of catalyst are known for oxidizing hydrochloric acid to produce chlorine, but I prefer to use catalysts which are compounds or mixtures of compounds which contain copper from group 1, together with beryllium or magnesium from group 2 and vanadium from group 5. Copper and vanadium are the two most important elements to have present in such catalysts. In addition to copper from group 1, I may use potassium, and in addition to vanadium from group 5, I may use bismuth or antimony, or both, in a catalyst for my process. In using these catalysts, it will be found that they absorb oxygen and chlorine during the initial stages, and this initial treatment may be termed an activating treatment. Further information regarding these catalysts and the methods of preparing them will be found in my co-pending applications Ser. No. 89,521, filed July 8, 1936, and issued on February 27, 1940 as U. S. Patent No. 2,191,980, of which application the present case is a divisional, and Ser. No. 205,006, filed April 29, 1938, which issued on February 27, 1940 as U. S. Patent No. 2,191,981.

In the drawing, the figure represents a flow sheet for carrying out my process.

In the drawing the reference character 10 designates a fan which forces known quantities of dry hydrochloric acid gas and dry, commercially pure oxygen through line 12 through any suitable heater 14 into the first oxidizing chamber 16. The ratio of the hydrochloric acid gas to the oxygen is about 4.05 to 1.0 by volume. A slight excess of HCl over the theoretical amount is used. This fan is connected with a drier (not shown) in order to remove all traces of water from the starting gaseous products. The oxidizing chamber 16 contains catalyst material in tablet or pellet form which will be hereinafter described. In my work I have passed a mixture of hydrochloric acid gas and oxygen at a speed of 15 to 20 liters per hour per 150 cc. of catalyst through the oxidizing chamber 16. The chamber is maintained at a temperature of about 385° C. to 435° C. The temperature may be varied within this range to suit varying conditions to obtain the best results. As the reaction between HCl and $O_2$ to form chlorine and water is exothermic it is necessary to prevent the temperature in oxidizer 16 from rising too much and, therefore, I provide a jacket 18 for the oxidizer 16 having an inlet 20 and an outlet 21. Oil, such as mineral oil, is passed through the jacket to maintain the temperature of the chamber at the proper value. The heated oil leaving the oil jacket may be cooled in any known manner and then returned and recirculated through the jacket. The oxidizer is also preferably provided on its interior with a ceramic lining to protect the interior wall of the oxidizer 16. The ceramic lining is made in such manner as will allow sufficient radiation, and the temperature of the oil in the jacket keeps the metallic walls at a temperature high enough to prevent any condensation.

The gaseous mixture including the reaction products from the first oxidizing chamber 16 is passed through the line 22 to sulphuric acid scrubber 23 of known construction. These reaction products and the gases leaving the first oxidizing chamber contain chlorine, hydrochloric acid gas, oxygen and water. The purpose of the sulphuric acid scrubber is to remove the water formed during the reaction in the oxidizing chamber 16. Concentrated sulphuric acid is passed through line 24 by means of pump 26, into the scrubber to remove the water from the gaseous mixture. This water dilutes the sulphuric acid and the diluted sulphuric acid is removed through line 28 and is then treated in any known manner to remove this water to make concentrated sulphuric acid again which may be reused in the sulphuric acid scrubber.

The gaseous mixture leaving the sulphuric acid scrubber is at about 150° F. and contains chlorine, hydrochloric acid gas and oxygen. By removing the water formed during the reaction it is possible to cause further reaction between the HCl and O₂. This gaseous mixture is passed through the line 30 to a second oxidizing chamber 32 which contains the same amount of catalyst material in tablet or pellet form. This catalyst material is preferably of the same material as is provided in first chamber 16, but one of the other catalysts described in the said co-pending applications may be substituted. This second oxidizing chamber 32 is preferably electrically heated as at 36 to about 400° C. During the time that the gaseous mixture is held within the second oxidizing chamber further oxidation takes place and more chlorine gas is formed.

From the second oxidizing chamber the gaseous mixture is passed through line 40 into a hydrochloric acid remover 42. The pump 44 forces water through the line 46 into the hydrochloric acid remover to form a solution of hydrochloric acid which is drawn off through pipe 48. The chlorine gas does not dissolve in the water to any appreciable extent and is taken off through the line 50 and is passed to a drier (not shown) and then is liquefied and is ready for use.

The aqueous solution containing hydrochloric acid is drawn off at 48 and is then treated in any well known manner to remove the hydrochloric acid gas and this hydrochloric acid gas is then conducted back to the fan 10 to form a part of the hydrochloric acid gas which is used at the beginning of my process. The hydrochloric acid gas, for example, may be liberated by treating the solution with concentrated sulphuric acid. The sulphuric acid is used in sufficient amount and sufficient strength to expel the HCl as a gas. The water is absorbed by the sulphuric acid and may be removed by boiling the sulphuric acid. In this way the sulphuric acid may be recycled.

For a commercial plant producing about 25 tons of chlorine in 24 hours I will give the following instructions in which the quantities given are per minute basis. The proportions may be varied within limits. About 409 cubic feet of dry HCl and about 100 cubic feet of dry oxygen are passed through a drier and then through the first oxidizer 16 containing catalyst material as above described. From this oxidizer pass about 150 cubic feet of chlorine, about 109 cubic feet of HCl, about 25 cubic feet of oxygen and about 7.4 lbs. of water. This mixture is passed to the sulphuric acid scrubber 23 into which is passed about 83 lbs. of 93% sulphuric acid. During its passage therethrough the sulphuric acid absorbs water and about 90.4 lbs. of 84% sulphuric acid leave the scrubber.

The mixture of gases leaving the scrubber contains about 150 cubic feet of chlorine, about 109 cubic feet of HCl and about 25 cubic feet of oxygen. This mixture is passed through the second oxidizer 32 which also contains catalyst material to further oxidize the HCl. The gases leaving the second oxidizer contain about 41 cubic feet of HCl, about 184 cubic feet of chlorine, about 8 cubic feet of oxygen and about 1.67 lbs. of water. This mixture is passed through a hydrochloric acid remover and about 7.88 lbs. of water are added. The chlorine is taken off as a gas and passed to a drier. The amount of the chlorine is about 35 lbs. About 9.55 lbs. of water and about 4.10 lbs. of HCl are taken from the HCl remover and this solution can be treated to recover the HCl gas and the recovered gas may be used at the beginning of my process.

The volumes given in the above commercial plant example have been reduced to standard conditions of temperature and pressure.

What I claim is:

1. A process for the production of chlorine which comprises passing a substantially anhydrous gaseous mixture consisting of hydrogen chloride and oxygen substantially free from diluent gases and in the proportion of approximately 4 volumes of hydrogen chloride for each volume of oxygen into contact with a solid catalyst which essentially comprises a compound of copper and vanadium under oxidation conditions to form a gaseous mixture consisting of chlorine, water, hydrogen chloride and oxygen, treating the resulting mixture with a drying agent to remove water therefrom and passing the substantially anhydrous gaseous mixture consisting of chlorine, hydrogen chloride and oxygen into contact with a solid catalyst which essentially comprises a compound of copper and vanadium under oxidation conditions to increase the concentration of chlorine.

2. The process of claim 1 wherein the volume ratio of hydrogen chloride to oxygen in the gaseous mixture passed into the first oxidation stage is in the range of 4.05–4.09 to 1.

3. The process of claim 1 wherein the volume ratio of hydrogen chloride to oxygen in the gaseous mixture passed into the first oxidation stage is in the range of from 4.05–4.09 to 1, and wherein the catalyst in at least one of the oxidation stages essentially comprises a compound containing copper, vanadium and oxygen, and a compound of a metal of the group consisting of beryllium and magnesium.

4. The process of claim 1 wherein the volume ratio of hydrogen chloride to oxygen in the gaseous mixture passed into the first oxidation stage is in the range of from 4.05–4.09 to 1, and wherein the catalyst in at least one of the oxidation stages essentially comprises a compound containing copper, vanadium and oxygen, and a compound of a metal of the group consisting of bismuth and antimony.

FREDRIK W. DE JAHN.